(12) United States Patent
Tanaka et al.

(10) Patent No.: US 8,805,609 B2
(45) Date of Patent: Aug. 12, 2014

(54) APPARATUS AND METHOD FOR DETECTING ABNORMAL AIR-FUEL RATIO VARIATION

(75) Inventors: Hitoshi Tanaka, Nissin (JP); Isao Nakajima, Toyota (JP); Toshihiro Kato, Toyota (JP); Takefumi Uchida, Toyota (JP); Yoshihisa Oda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 246 days.

(21) Appl. No.: 13/477,647

(22) Filed: May 22, 2012

(65) Prior Publication Data

US 2012/0297866 A1 Nov. 29, 2012

(30) Foreign Application Priority Data

May 23, 2011 (JP) ................................. 2011-114731

(51) Int. Cl.
*F02D 41/14* (2006.01)
*G01M 15/00* (2006.01)

(52) U.S. Cl.
USPC ........................................ 701/107; 73/114.31

(58) Field of Classification Search
CPC . G01M 15/104; G01M 15/05; F02D 41/0085; F02D 41/1495; F02D 41/221
USPC ............. 73/114.31, 114.38, 114.45; 701/103, 701/104, 107
See application file for complete search history.

(56) References Cited

U.S. PATENT DOCUMENTS

| | | | | |
|---|---|---|---|---|
| 6,564,616 B2 * | 5/2003 | Antonioli et al. | ............... | 73/49.7 |
| 6,655,357 B2 * | 12/2003 | Murakami et al. | ............ | 123/479 |
| 8,024,109 B2 * | 9/2011 | Fuwa et al. | .................... | 701/114 |
| 8,074,503 B2 * | 12/2011 | Tsutsumi et al. | .......... | 73/114.38 |
| 8,443,656 B2 * | 5/2013 | Hakariya et al. | ............ | 73/114.63 |
| 8,548,718 B2 * | 10/2013 | Kato et al. | ..................... | 701/107 |
| 8,620,564 B2 * | 12/2013 | Hakariya et al. | .............. | 701/104 |
| 2002/0096158 A1 * | 7/2002 | Murakami et al. | ............ | 123/690 |
| 2008/0312806 A1 * | 12/2008 | Ueda | ............................. | 701/103 |
| 2009/0211350 A1 * | 8/2009 | Iwazaki et al. | ............ | 73/114.72 |
| 2009/0260347 A1 * | 10/2009 | Iwazaki et al. | .................. | 60/277 |
| 2010/0122573 A1 * | 5/2010 | Tsutsumi et al. | .......... | 73/114.38 |
| 2010/0168986 A1 * | 7/2010 | Iwazaki et al. | ................ | 701/103 |
| 2010/0211290 A1 * | 8/2010 | Kidokoro et al. | ............ | 701/103 |
| 2011/0191005 A1 | 8/2011 | Iwazaki et al. | | |
| 2011/0219861 A1 | 9/2011 | Kayama et al. | | |
| 2012/0022772 A1 * | 1/2012 | Miyamoto et al. | ............ | 701/104 |
| 2012/0253642 A1 * | 10/2012 | Kitano et al. | ................. | 701/104 |
| 2012/0277979 A1 | 11/2012 | Kato et al. | | |
| 2013/0226437 A1 * | 8/2013 | Kato et al. | .................... | 701/104 |

FOREIGN PATENT DOCUMENTS

| | | | |
|---|---|---|---|
| JP | 2008-144639 | A | 6/2008 |
| JP | 2009-180171 | A | 8/2009 |
| JP | 2011144779 | A | 7/2011 |
| JP | 2011149362 | A | 8/2011 |
| JP | 2011179492 | A | 9/2011 |
| JP | 2011185159 | A | 9/2011 |
| JP | 2012-233425 | A | 11/2012 |

* cited by examiner

*Primary Examiner* — John Fitzgerald
(74) *Attorney, Agent, or Firm* — Gifford, Krass, Sprinkle, Anderson & Citkowski, P.C.

(57) ABSTRACT

An apparatus for detecting an abnormal air-fuel ratio variation, includes an abnormality detecting unit that detects an abnormal variation in each of a plurality of fuel injection valves on the basis of an injection ratio between the plurality of fuel injection valves, a fluctuation in the output before the injection ratio is changed and the fluctuation in the output after the injection ratio is changed; and a setting unit that corrects the abnormality determination threshold for each of the plurality of fuel injection valves on the basis of the injection ratio.

6 Claims, 10 Drawing Sheets

(I) $\alpha = A = 40(\%)$     (II) $\alpha = B = 80(\%)$

DURING NORMAL TIMES

DURING INTAKE SYSTEM ABNORMALITY 50%

DURING DI ABNORMALITY 50%

DURING PFI ABNORMALITY 50%

APPARATUS AND METHOD FOR DETECTING ABNORMAL AIR-FUEL RATIO VARIATION

CROSS REFERENCE TO RELATED APPLICATIONS

This application claims priority to Japanese Patent Application No. 2011-114731 filed on May 23, 2011, which is incorporated herein by reference in its entirety including the specification, drawings and abstract.

BACKGROUND OF THE INVENTION

1. Field of the Invention

The invention relates to an apparatus and method for detecting an abnormal air-fuel ratio variation among cylinders and, more particularly, to an apparatus and method for detecting a relatively large variation in air-fuel ratio among cylinders of a multi-cylinder internal combustion engine.

2. Description of Related Art

Generally, in an internal combustion engine provided with an exhaust emission control system that uses a catalyst, it is necessary to control the mixture ratio, that is, the air-fuel ratio, of an air-fuel mixture to be burned in the internal combustion engine in order to purify toxic substances in exhaust gas using the catalyst with high efficiency. To control the air-fuel ratio, an air-fuel ratio sensor is provided in an exhaust passage of the internal combustion engine, and then feedback control is executed such that the air-fuel ratio detected by the air-fuel ratio sensor coincides with a predetermined target air-fuel ratio.

On the other hand, in a multi-cylinder internal combustion engine, air-fuel ratio control is usually executed over all the cylinders using the same control amount, so an actual air-fuel ratio may vary among the cylinders even when air-fuel ratio control is executed. At this time, if the variation is small, the variation may be absorbed by air-fuel ratio feedback control, and, in addition, toxic substances in exhaust gas may be purified by the catalyst. Therefore, such a small variation does not influence exhaust emissions.

However, for example, if a fuel injection system of part of the cylinders fails and, therefore, the air-fuel ratio varies by a large amount among the cylinders, exhaust emissions deteriorate. It is desirable that such a large air-fuel ratio variation that deteriorates exhaust emissions is detected as an abnormality. Particularly, in the case of an internal combustion engine for an automobile, it is required to detect an abnormal air-fuel ratio variation among the cylinders in an on-board state in order to prevent travel of a vehicle that emits deteriorated exhaust emissions. In recent years, there are moves to regulate travel of such a vehicle.

For example, an apparatus described in Japanese Patent Application Publication No. 2008-144639 (JP 2008-144639 A) detects an abnormal air-fuel ratio variation among cylinders on the basis of a fluctuation in the air-fuel ratio of an internal combustion engine. In addition, at the time of detecting the air-fuel ratio, the apparatus corrects an error of a detected air-fuel ratio on the basis of an engine rotational speed and an intake air flow rate.

An apparatus described in Japanese Patent Application Publication No. 2009-180171 (JP 2009-180171 A), which is configured to detect an abnormal air-fuel ratio variation among cylinders on the basis of a fluctuation in the air-fuel ratio of an internal combustion engine, changes an injection ratio between a plurality of fuel injection valves provided for each of the plurality of cylinders and then identifies which fuel injection valve causes the abnormal variation on the basis of an air-fuel ratio before changing the injection ratio and an air-fuel ratio after changing the injection ratio.

However, when the configuration described in JP 2008-144639 A is directly applied to an internal combustion engine having a plurality of fuel injection valves for each cylinder, it leads to erroneous detection due to a change in injection ratio. In addition, the configuration described in JP 2009-180171 A is able to determine whether there is an abnormality and to identify which fuel injection valve has an abnormality; however, there is also a possibility of erroneous detection due to a change in injection ratio.

SUMMARY OF THE INVENTION

The invention provides an apparatus and method for detecting an abnormal air-fuel ratio variation, which reduce a possibility of erroneous detection due to a change in injection ratio in a configuration for identifying which one of a plurality of fuel injection valves, provided for each of a plurality of cylinders, causes an abnormal variation.

A first aspect of the invention relates to an apparatus for detecting an abnormal air-fuel ratio variation includes: an abnormality detecting unit that detects an abnormal variation in air-fuel ratio among a plurality of cylinders of an internal combustion engine, that has a plurality of fuel injection valves for each of the cylinders, on the basis of a fluctuation in output of the internal combustion engine; and a setting unit that sets an abnormality determination threshold for determining whether the output has an abnormality on the basis of a rotational speed of the internal combustion engine and a load. The abnormality detecting unit detects an abnormal variation in each of the plurality of fuel injection valves on the basis of an injection ratio between the plurality of fuel injection valves, the fluctuation in the output before the injection ratio is changed and the fluctuation in the output after the injection ratio is changed. The setting unit corrects the abnormality determination threshold for each of the plurality of fuel injection valves on the basis of the injection ratio.

A second aspect of the invention relates to a method of detecting an abnormal air-fuel ratio variation for an internal combustion engine having a plurality of fuel injection valves for each of a plurality of cylinders. The method includes: detecting an abnormal variation in each of the plurality of fuel injection valves on the basis of an injection ratio between the plurality of fuel injection valves, a fluctuation in output before the injection ratio is changed and a fluctuation in the output after the injection ratio is changed; setting an abnormality determination threshold for determining whether the output has an abnormality on the basis of a rotational speed of the internal combustion engine and a load; and correcting the abnormality determination threshold for each of the plurality of fuel injection valves on the basis of the injection ratio.

According to the aspects of the invention, it is advantageously possible to reduce a possibility of erroneous detection due to a change in injection ratio in a configuration for identifying which one of a plurality of fuel injection valves, provided for each of a plurality of cylinders, causes an abnormal variation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings.

Figure 1:
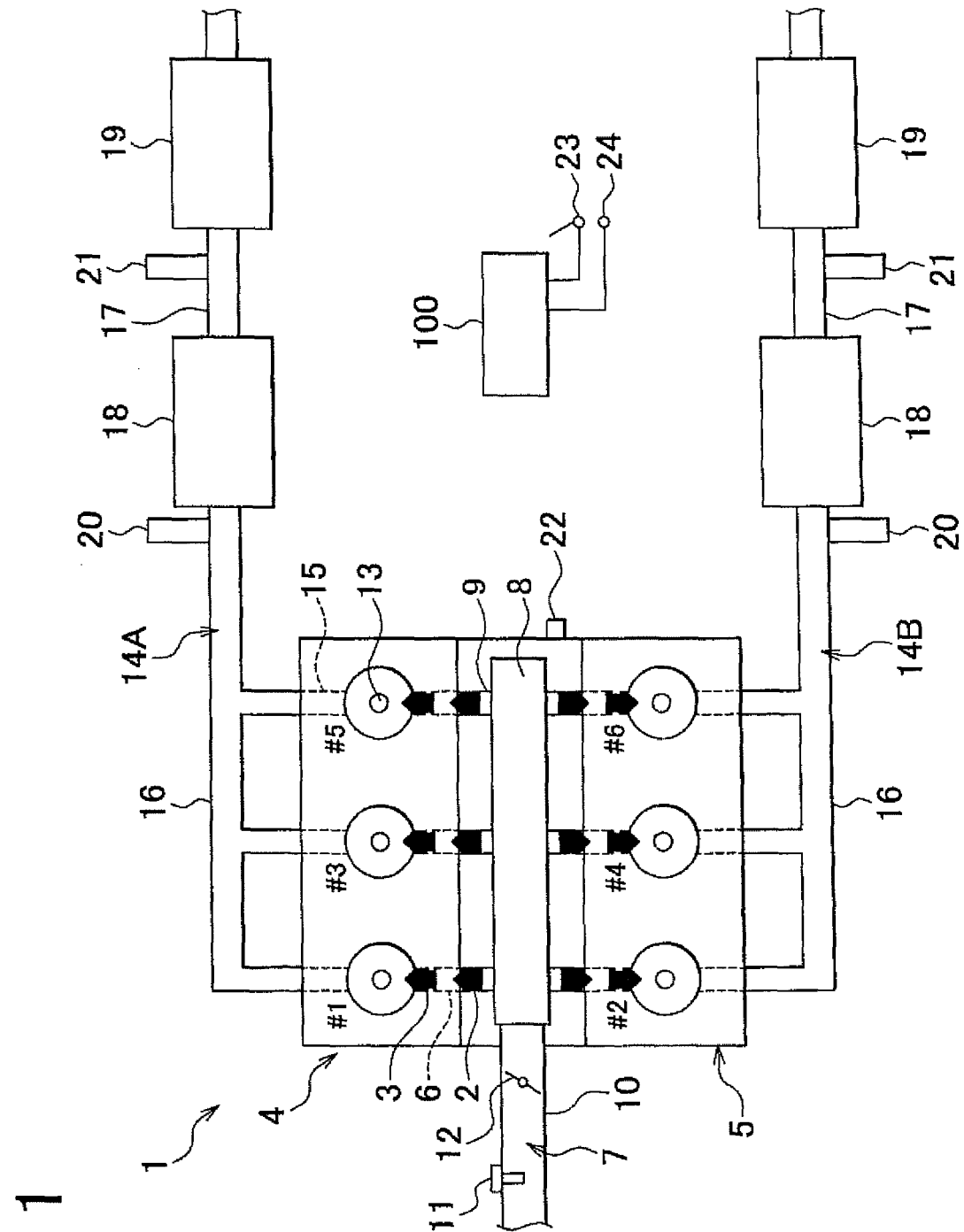
FIG. 1 is a schematic view of an internal combustion engine according to an embodiment of the invention.

FIG. 1 schematically shows an internal combustion engine according to the present embodiment. The internal combustion engine (engine) 1 shown in the drawing is a V-six dual injection gasoline engine. An intake passage injector 2 and a direct injector 3 are provided for each of cylinders #1 to #6. The engine 1 has a first bank 4 and a second bank 5. The first bank 4 has odd-number cylinders, that is, the cylinders #1, #3 and #5. The second bank 5 has even-number cylinders, that is, the cylinders #2, #4 and #6.

Each intake passage injector 2 injects fuel toward the inside of an intake passage, particularly, an intake port 6, of a corresponding one of the cylinders so as to achieve so-called homogeneous combustion. Hereinafter, each intake passage injector is also referred to as "PFI". On the other hand, each direct injector 3 directly injects fuel toward the inside of a corresponding one of the cylinders (combustion chambers) so as to achieve so-called stratified combustion. Hereinafter, each direct injector is also referred to as "DI".

An intake passage 7 for introducing intake air includes not only the intake ports 6 but also a surge tank 8, a plurality of intake manifolds 9 and an intake pipe 10. The surge tank 8 serves as a collecting portion. The plurality of intake manifolds 9 connect the intake ports 6 of the respective cylinders and the surge tank 8. The intake pipe 10 is located upstream of the surge tank 8. An air flow meter 11 and an electronically controlled throttle valve 12 are provided in the intake pipe 10 in order from the upstream side. The air flow meter 11 outputs a signal corresponding to an intake air flow rate. An ignition plug 13 is provided for each cylinder. The ignition plug 13 is used to ignite air-fuel mixture in the corresponding cylinder.

In the case of the present embodiment, an exhaust passage for emitting exhaust gas is formed of a first exhaust passage 14A for the first bank 4 and a second exhaust passage 14B for the second bank 5 in separate systems. That is, two exhaust systems are independently provided in correspondence with the banks. The exhaust systems for both banks have the same configuration, so only the first bank 4 will be described here, like reference numerals denote similar components of the second bank 5 in the drawings, and the description thereof is omitted.

The first exhaust passage 14A includes exhaust ports 15 of the cylinders #1, #3 and #5, an exhaust manifold 16 and an exhaust pipe 17. The exhaust manifold 16 collects exhaust gas from these exhaust ports 15. The exhaust pipe 17 is connected to the downstream end of the exhaust manifold 16. Then, three-way catalysts, that is, an upstream catalyst 18 and a downstream catalyst 19, are serially provided respectively on the upstream side and downstream side of the exhaust pipe 17. Air-fuel ratio sensors, that is, a pre-catalyst sensor 20 and a post-catalyst sensor 21, are respectively provided on the upstream side and downstream side of the upstream catalyst 18 in order to detect the air-fuel ratio of exhaust gas. These sensors detect the air-fuel ratio on the basis of the oxygen concentration in exhaust gas. In this way, the single pre-catalyst sensor 20 is provided at the collecting portion of the exhaust passage for one of the banks.

Particularly, the pre-catalyst sensors 20 is separately provided in each of the first exhaust passage 14A for the first bank 4 and the second exhaust passage 14B for the second bank 5.

The above described PFIs 2, DIs 3, throttle valve 12, ignition plugs 13, and the like, are electrically connected to an electronic control unit (hereinafter, referred to as ECU) 100 that serves as a control unit. The ECU 100 includes a CPU, a ROM, a RAM, input/output ports, a storage device, and the like (all of which are not shown). In addition, as shown in the drawing, in addition to the above described air flow meter 11, pre-catalyst sensors 20 and post-catalyst sensors 21, a crank angle sensor 22, an accelerator operation amount sensor 23, a coolant temperature sensor 24 and other various sensors (not shown) are electrically connected to the ECU 100 via an A/D converter (not shown), or the like. The crank angle sensor 22 is used to detect the crank angle of the engine 1. The accelerator operation amount sensor 23 is used to detect the accelerator operation amount. The coolant temperature sensor 24 is used to detect the temperature of coolant of the engine 1. The ECU 100 controls the PFIs 2, the DIs 3, the throttle valve 12, the ignition plugs 13, and the like, on the basis of values detected by various sensors, or the like, so as to obtain desired output to thereby control the fuel injection amount, the fuel injection timing, the throttle opening degree, the ignition timing, and the like. In addition, the ECU 100 detects the crank angle of the engine 1 on the basis of the signal output from the crank angle sensor 22, and calculates the engine rotational speed. Here, the number of revolutions per minute (rpm) is used as the engine rotational speed.

Figure 2:
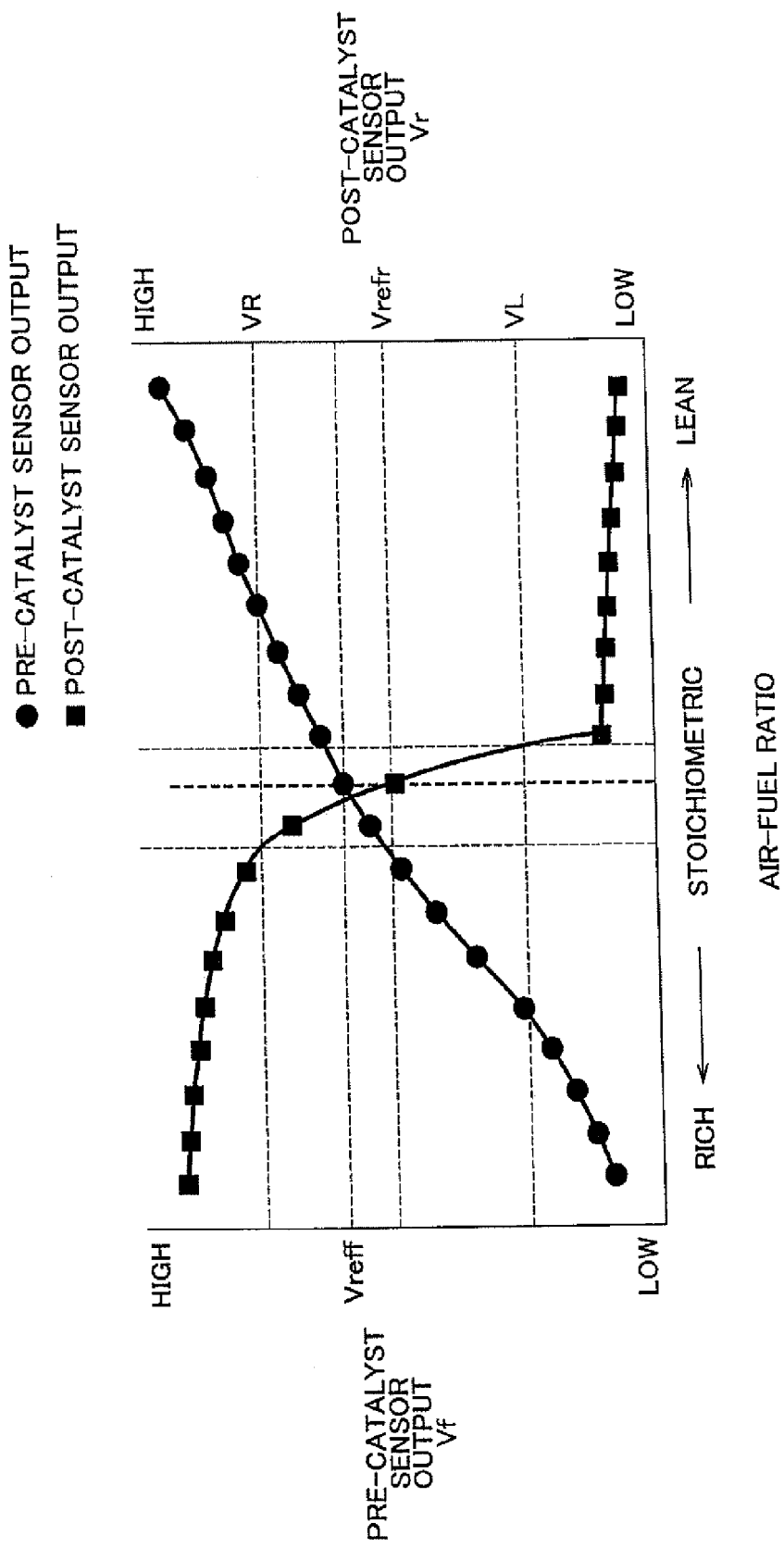
FIG. 2 is a graph that shows the output characteristics of a pre-catalyst sensor and the output characteristics of a post-catalyst sensor.

The pre-catalyst sensor 20 is formed of a so-called wide range air-fuel ratio sensor, and is able to continuously detect an air-fuel ratio over a relatively wide range. FIG. 2 shows the output characteristics of the pre-catalyst sensor 20. As shown in the graph, the pre-catalyst sensor 20 outputs a voltage signal Vf having a level that is directly proportional to the air-fuel ratio of exhaust gas. When the exhaust gas air-fuel ratio is a stoichiometric air-fuel ratio (for example, A/F=14.6), the output voltage is Vreff (for example, about 3.3 V).

On the other hand, the post-catalyst sensor 21 is formed of a so-called O2 sensor, and has such a characteristic that the output value steeply varies at the stoichiometric air-fuel ratio. FIG. 2 shows the output characteristics of the post-catalyst sensor 21. As shown in the graph, when the air-fuel ratio of exhaust gas is the stoichiometric air-fuel ratio, the output voltage, that is, a stoichiometric air-fuel ratio corresponding value, is Vrefr (for example, 0.45 V). The output voltage of the post-catalyst sensor 21 varies within a predetermined range (for example, from 0 to 1 V). When the exhaust gas air-fuel ratio is leaner than the stoichiometric air-fuel ratio, the output voltage of the post-catalyst sensor is lower than the stoichiometric air-fuel ratio corresponding value Vrefr; whereas, when the exhaust gas air-fuel ratio is richer than the stoichiometric air-fuel ratio, the output voltage of the post-catalyst sensor is higher than the stoichiometric air-fuel ratio corresponding value Vrefr.

The upstream catalyst 18 and the downstream catalyst 19 each purify NOx, HC and CO, which are toxic substances in exhaust gas, at the same time when the air-fuel ratio A/F of exhaust gas flowing into the catalyst is near the stoichiometric air-fuel ratio. The range (window) of air-fuel ratio, in which these three substances may be purified at the same time with high efficiency, is relatively narrow.

Air-fuel ratio control (stoichiometric air-fuel ratio control) is executed by the ECU 100 such that the air-fuel ratio of exhaust gas flowing into the upstream catalyst 18 is controlled to near the stoichiometric air-fuel ratio. The air-fuel ratio control is formed of main air-fuel ratio control (main air-fuel ratio feedback control) and sub-air-fuel ratio control (sub-air-fuel ratio feedback control). In the main air-fuel ratio control, the exhaust gas air-fuel ratio detected by the pre-catalyst sensor 20 is brought into coincidence with the stoichiometric air-fuel ratio that is a predetermined target air-fuel ratio. In the sub-air-fuel ratio control, the exhaust gas air-fuel ratio detected by the post-catalyst sensor 21 is brought into coincidence with the stoichiometric air-fuel ratio.

Such air-fuel ratio control is executed over each bank. That is, air-fuel ratio control is executed over the cylinders #1, #3 and #5 that belong to the first bank 4 on the basis of signals output from the pre-catalyst sensor 20 and the post-catalyst sensor 21 for the first bank 4. On the other hand, air-fuel ratio control is executed over the cylinders #2, #4 and #6 that belong to the second bank 5 on the basis of signals output from the pre-catalyst sensor 20 and the post-catalyst sensor 21 for the second bank 5.

In addition, in the present embodiment, a total fuel injection amount injected during one injection cycle in one cylinder is distributed to the PFI 2 and the DI 3 on the basis of predetermined injection rates $\alpha$ and $\beta$. At this time, the ECU 100 sets the amount of fuel injected from the PFI 2 (referred to as port injection amount) and the amount of fuel injected from the DI 3 (referred to as direct injection amount) on the basis of the injection rates $\alpha$ and $\beta$, and energization control over the injectors 2 and 3 on the basis of these amounts of fuel. The injection rates $\alpha$ and $\beta$ each are the percentage of port injection amount or direct injection amount with respect to a total fuel injection amount here, and each have a value of 0 to 100 ($\beta=100-\alpha$). Where the total fuel injection amount is Qt, the port injection amount Qp is expressed by $\alpha \times Qt/100$, the direct injection amount Qd is expressed by $\beta \times Qt/100$, and the injection ratio of both is Qp:Qd=$\alpha$:$\beta$. In this way, the injection rate $\alpha$ is a value that defines the injection rate of the PFI 2 or the injection rate of the port injection amount Qp, and the injection rate $\beta$ is a value that defines the injection rate of the DI 3 or the injection rate of the direct injection amount Qd. The total fuel injection amount Qt is set by the ECU 100 on the basis of an engine operating state (for example, an engine rotational speed and a load).

Figure 3:
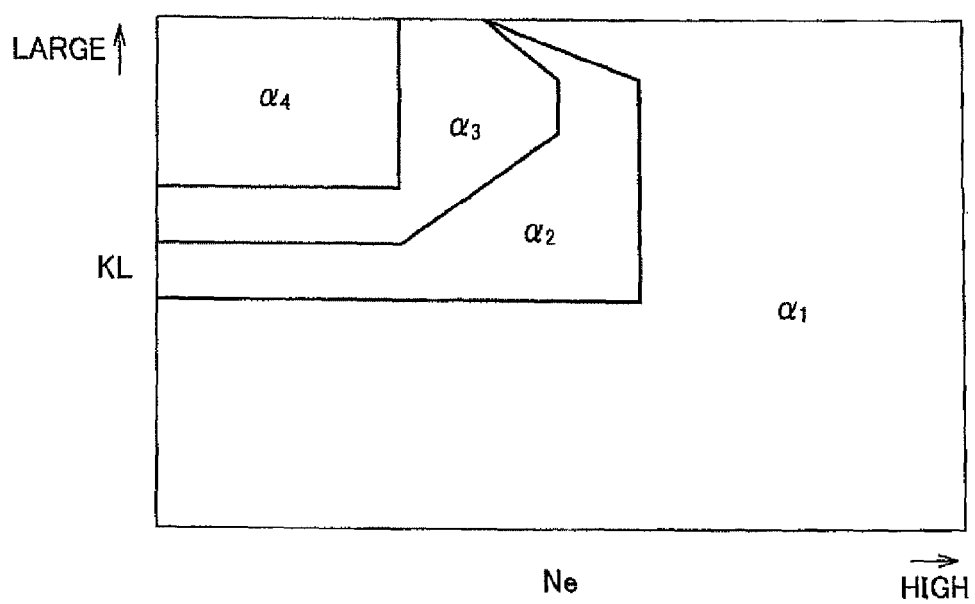
FIG. 3 shows a map for setting an injection rate.

FIG. 3 shows a map for setting the injection rate $\alpha$. As shown in the map, the injection rate $\alpha$ varies from $\alpha1$ to $\alpha4$ depending on regions defined by the engine rotational speed Ne and the load KL. For example, $\alpha1$=0, $\alpha2$=35, $\alpha3$=50 and $\alpha4$=70; however, these values and allocation of the regions may be selectively changed. In this example, the rate of the port injection amount increases toward low-rotation high-load operation. In addition, injection distribution is not carried out in the region of $\alpha=\alpha1$, and fuel is supplied only through direct injection. The same injection rates $\alpha$ and $\beta$ are used for each of the cylinders of both bank. That is, the injection rates $\alpha$ and $\beta$ are not separately set for each bank.

Then, for example, it is assumed that part of the injectors of all the cylinders fail and an air-fuel ratio variation (imbalance) occurs among the cylinders. For example, this is the case where the fuel injection amount of the cylinder #1 becomes larger than the fuel injection amount of each of the other cylinders #2 to #6 and, therefore, the air-fuel ratio of the cylinder #1 significantly deviates toward a rich side with respect to the air-fuel ratio of each of the other cylinders #2 to #6. At this time, when a relatively large correction amount is applied to the first bank 2 including the cylinder #1 through the above described main air-fuel ratio feedback control, the air-fuel ratio of total gas may be controlled to the stoichiometric air-fuel ratio. However, observing the air-fuel ratio cylinder by cylinder, the air-fuel ratio of the cylinder #1 is much richer than the stoichiometric air-fuel ratio, the air-fuel ratio of each of the cylinders #3 and #5 is leaner than the stoichiometric air-fuel ratio, and then the air-fuel ratio of all the cylinders is the stoichiometric air-fuel ratio in total, so it is undesirable in terms of emissions. Then, in the present embodiment, an apparatus for detecting the abnormal air-fuel ratio variation among the cylinders is provided.

Figure 4:
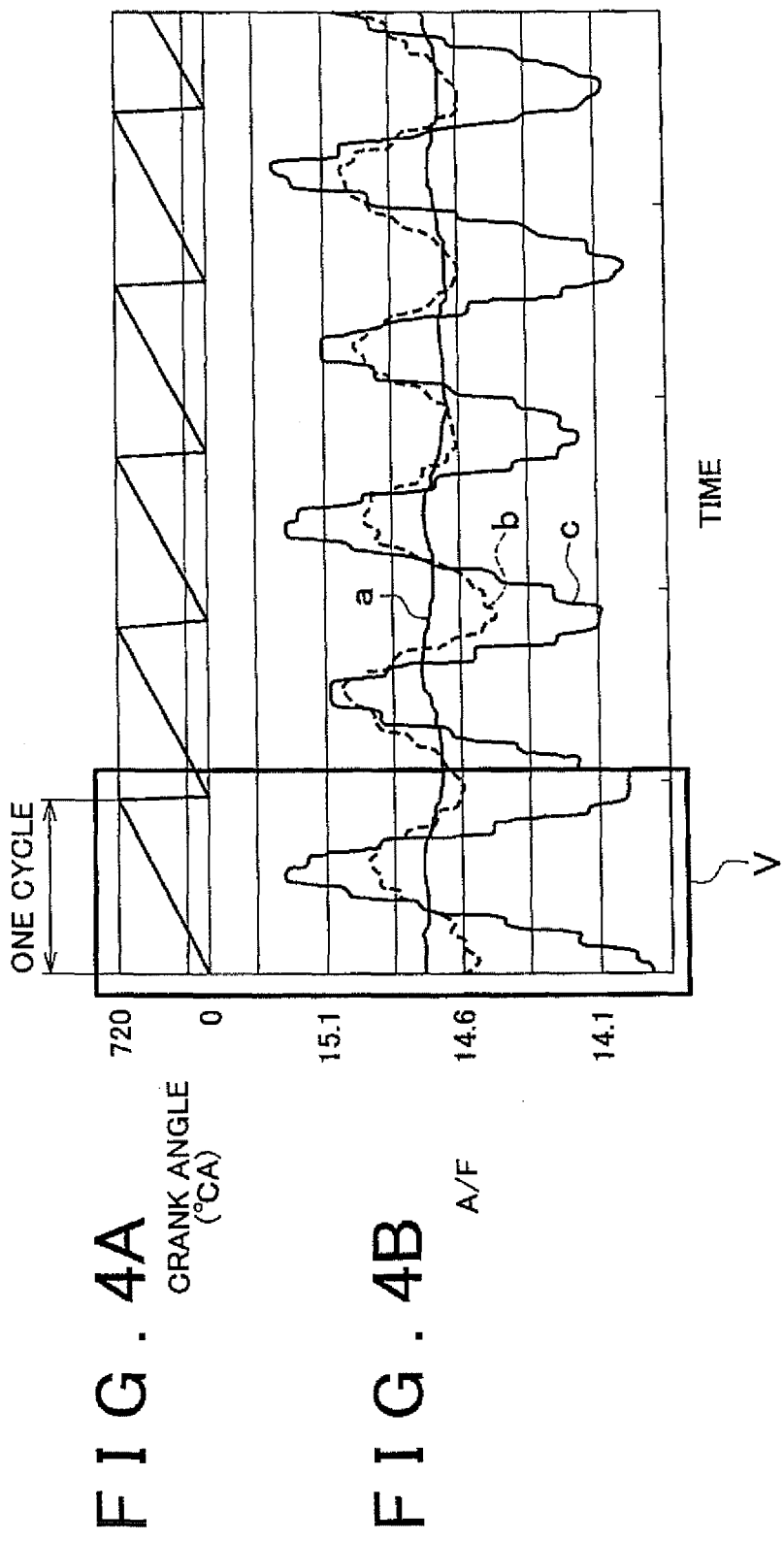
FIG. 4A and FIG. 4B are time charts that show a fluctuation in air-fuel ratio sensor output.

FIG. 4A and FIG. 4B show a fluctuation in air-fuel ratio sensor output in an in-line four-cylinder engine different from the present embodiment. As shown in the chart, the exhaust gas air-fuel ratio A/F detected by an air-fuel ratio sensor tends to periodically fluctuate in a period of one engine cycle (=720° CA). Then, as the air-fuel ratio variation occurs among the cylinders, a fluctuation in one engine cycle increases. The air-fuel ratio lines a, b and c in FIG. 4B respectively indicate the case where there is no variation, the case where the air-fuel ratio deviates toward a rich side by the imbalance percentage of 20% in only one cylinder and the case where the air-fuel ratio deviates toward a rich side by the imbalance percentage of 50% in only one cylinder. As is apparent from the chart, as the degree of variation increases, the amplitude of fluctuation in air-fuel ratio increases. The same tendency occurs in each bank even in the V-six engine as in the case of the present embodiment.

Here, the imbalance percentage (%) is a parameter that indicates the degree of air-fuel ratio variation among the cylinders. That is, the imbalance percentage is a value that, when a deviation in fuel injection amount is occurring in only one cylinder among all the cylinders, indicates the percentage of deviation of the fuel injection amount of that cylinder (imbalance cylinder) in which the deviation of fuel injection amount is occurring from a fuel injection amount of each of the cylinders (balance cylinders) in which no deviation of fuel injection amount is occurring, that is, a reference injection amount. Where the imbalance percentage is IB, the fuel injection amount of the imbalance cylinder is Qib and the fuel injection amount of each balance cylinder, that is, the reference injection amount, is Qs, IB=(Qib−Qs)/Qs. As the imbalance percentage IB increases, the deviation of fuel injection amount of the imbalance cylinder with respect to the fuel injection amount of each balance cylinder increases, and the degree of air-fuel ratio variation increases. The imbalance percentage may be the rate of a difference in fuel injection amount with respect to the mean fuel injection amount of the plurality of cylinders, such as all the cylinders of one of the banks or both banks.

Detecting Abnormal Air-Fuel Ratio Variation Among Cylinders

As can be understood from the above description, as an abnormal air-fuel ratio variation occurs, a fluctuation in air-fuel ratio sensor output increases. Then, it is possible to detect an abnormal variation on the basis of the output fluctuation.

Here, the type of abnormal variation includes an abnormal rich deviation that the fuel injection amount of one cylinder deviates toward a rich side (excessive fuel side) and an abnormal lean deviation that the fuel injection amount of one cylinder deviates toward a lean side (insufficient fuel side). In the present embodiment, an abnormal rich deviation is detected on the basis of a fluctuation in air-fuel ratio sensor output. However, an abnormal lean deviation may be detected or an abnormal deviation may be widely detected without distinguishing an abnormal rich deviation and an abnormal lean deviation from each other. FIG. 7 illustrates the principles of detecting an abnormal rich deviation.

At the time of detecting an abnormal rich deviation, an air-fuel ratio fluctuation parameter that correlates with the degree of fluctuation in air-fuel ratio sensor output is calculated, and the air-fuel ratio fluctuation parameter is compared with a predetermined abnormality determination value to thereby detect an abnormality. Here, abnormality detection is carried out using a signal output from the pre-catalyst sensor 20, which is the corresponding air-fuel ratio sensor, bank by bank.

Figure 5:
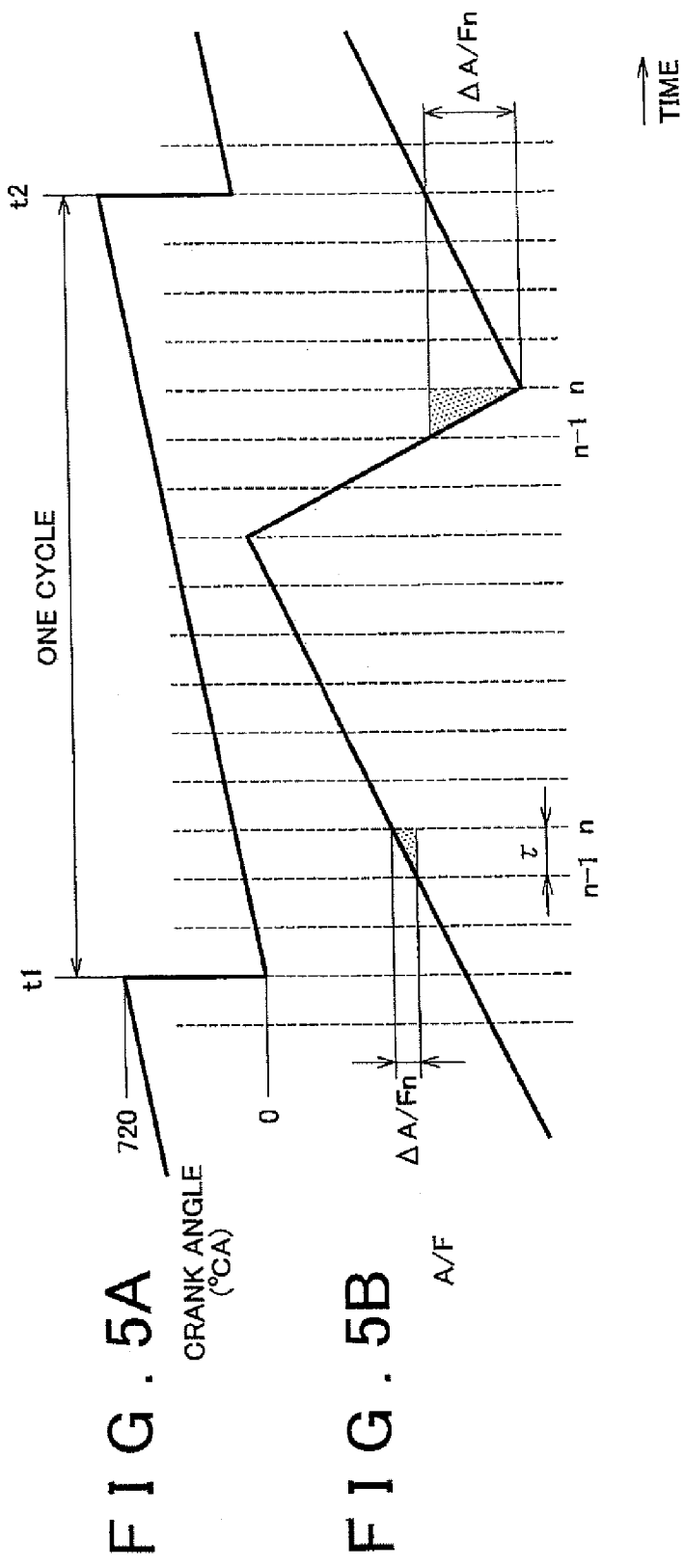
FIG. 5A and FIG. 5B are enlarged time charts corresponding to portion V of FIG. 4A and FIG. 4B.

Hereinafter, a method of calculating the air-fuel ratio fluctuation parameter will be described. FIG. 5A and FIG. 5B are enlarged time charts corresponding to portion V of FIG. 4A and FIG. 4B, and particularly show a fluctuation in pre-catalyst sensor output within one engine cycle. A value obtained by converting the output voltage Vf of the pre-catalyst sensor 20 into the air-fuel ratio A/F is used as a pre-catalyst sensor output. However, the output voltage Vf of the pre-catalyst sensor 20 may be directly used instead.

As shown in FIG. 5B, the ECU 100 acquires the value of pre-catalyst sensor output A/F at a predetermined sampling interval $\tau$ (unit time, for example, 4 ms) within one engine cycle. Then, the absolute value of the difference $\Delta A/Fn$ between a value $A/Fn$ acquired at the current timing (second timing) and a value $A/Fn-1$ acquired at the previous timing (first timing) is obtained from the following mathematical expression (1). The difference $\Delta A/Fn$ may be read as a differential value or a slope at the current timing.

$$\Delta A/Fn = A/Fn - A/Fn-1 \quad (1)$$

Most simply, the difference $\Delta A/Fn$ indicates a fluctuation in pre-catalyst sensor output. This is because, as the degree of fluctuation increases, the slope of air-fuel ratio line increases and, therefore, the difference $\Delta A/Fn$ increases. Then, the value of the difference $\Delta A/Fn$ at predetermined one timing may be set as the air-fuel ratio fluctuation parameter.

However, in the present embodiment, in order to improve accuracy, the mean value of a plurality of differences $\Delta A/Fn$ is set as the air-fuel ratio fluctuation parameter. In the present embodiment, in one engine cycle, the difference $\Delta A/Fn$ is accumulated at each timing, and the final accumulated value is divided by the number of samples N to thereby obtain the mean value of the differences $\Delta A/Fn$ in one engine cycle. Then, furthermore, the mean value of the differences $\Delta A/Fn$ is accumulated by the number of M engine cycles (for example, M=100), and the final accumulated value is divided by the number of cycles M to thereby obtain the mean value of the differences $\Delta A/Fn$ in M engine cycles. The thus obtained final mean value is set as the air-fuel ratio fluctuation parameter, and is referred to as "air-fuel ratio fluctuation parameter X" in the following description.

As the degree of fluctuation in pre-catalyst sensor output increases, the air-fuel ratio fluctuation parameter X increases. Then, it is determined that a fluctuation in air-fuel ratio has an abnormality when the air-fuel ratio fluctuation parameter X is larger than or equal to a predetermined abnormality determination value; whereas it is determined that a fluctuation in air-fuel ratio has no abnormality, that is, a fluctuation in air-fuel ratio is normal, when the air-fuel ratio fluctuation parameter X is smaller than the abnormality determination value. Note that the cylinder discrimination function of the ECU 100 is able to associate an ignition cylinder with the air-fuel ratio fluctuation parameter X corresponding to the ignition cylinder.

Note that there are the case where the pre-catalyst sensor output A/F increases and the case where the pre-catalyst sensor output A/F reduces, so the above described difference $\Delta A/Fn$ or the mean value of the differences $\Delta A/Fn$ may be obtained only for one of these cases and may be set as the fluctuation parameter. Particularly, in the case of a rich deviation of only one cylinder, the pre-catalyst sensor output steeply varies toward a rich side (that is, steeply reduces) at the time when the pre-catalyst sensor receives exhaust gas corresponding to that one cylinder, so only a reduction-side value may be used to detect a rich deviation (rich imbalance determination). In this case, only a downward-sloping region in the graphs of FIG. 5A and FIG. 5B is utilized to detect a rich deviation. Generally, a transition from a lean air-fuel ratio to a rich air-fuel ratio is mostly steeper than a transition from a rich air-fuel ratio to a lean air-fuel ratio, so it may be expected to accurately detect a rich deviation with this method. Of course, the configuration is not limited to this. It is also applicable that only an increasing-side value is used or both a reduction-side value and an increasing-side value are used (by accumulating the absolute value of the difference $\Delta A/Fn$ and then comparing the accumulated value with a threshold).

Figure 6:
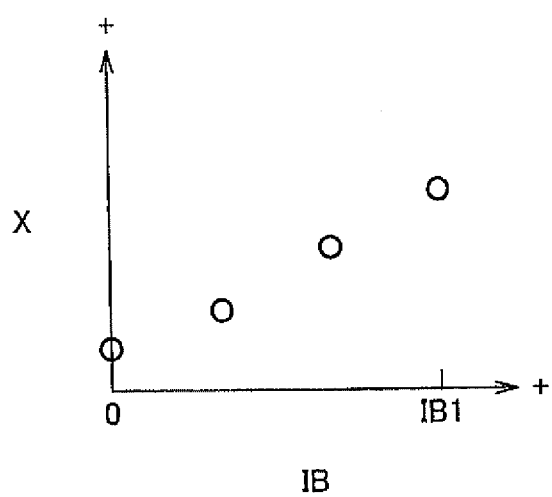
FIG. 6 is a graph that shows the correlation between an imbalance percentage and an air-fuel ratio fluctuation parameter.
Figure 7A:
FIG. 7A to FIG. 7D are views for illustrating the principles of detecting an abnormal rich deviation.
Figure 7B:
Figure 7C:
Figure 7D:

FIG. 6 shows the correlation between an imbalance percentage IB and an air-fuel ratio fluctuation parameter X. As shown in the graph, there is a strong correlation between an imbalance percentage IB and an air-fuel ratio fluctuation parameter X, and, as the imbalance percentage IB increases, the air-fuel ratio fluctuation parameter X also increases. Here, IB1 in the graph is an imbalance percentage IB that corresponds to a criterion that is the boundary between normality and abnormality, and is, for example, 60(%).

Figure 9:
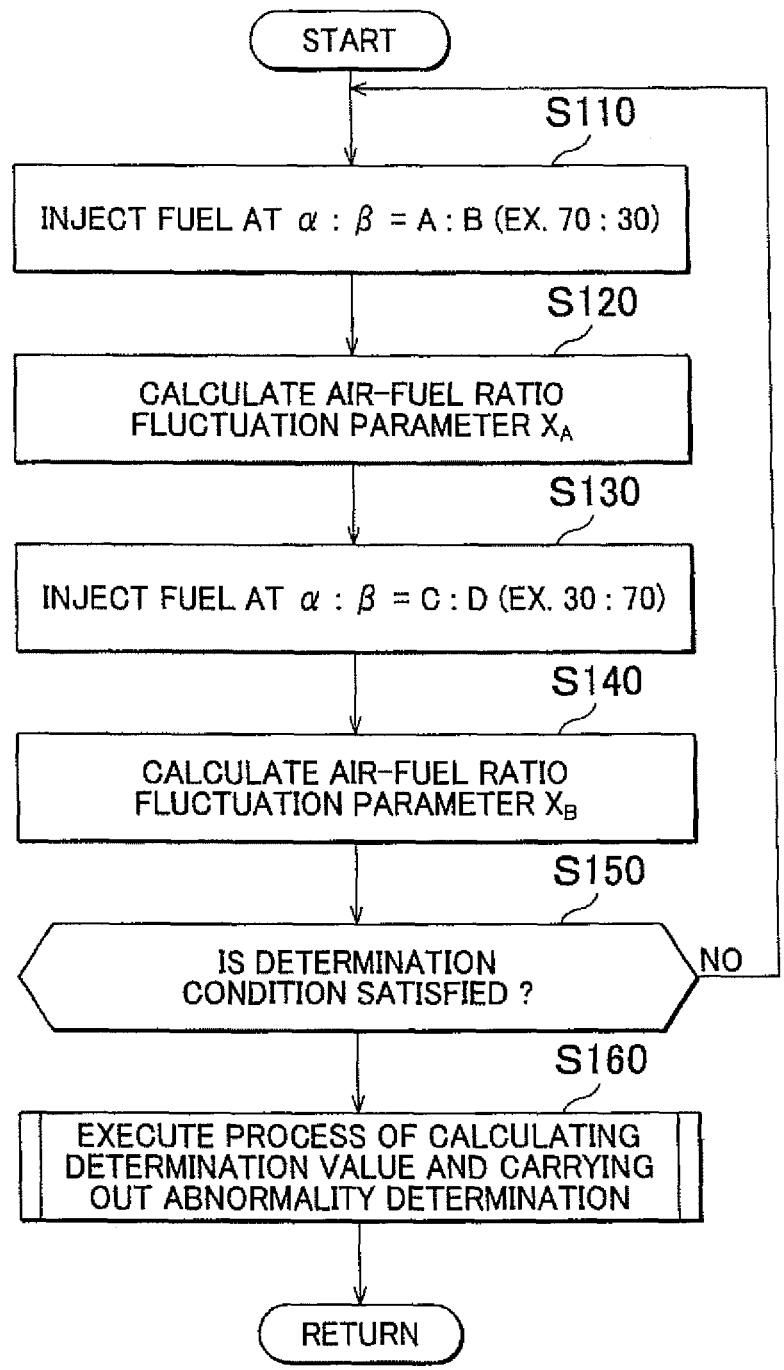
FIG. 9 is a flow chart that shows an abnormal variation detection routine.

In the present embodiment, an abnormal rich deviation associated with the injectors and an intake system abnormality are detected. FIG. 9 shows the process of calculating an air-fuel ratio fluctuation parameter and carrying out abnormality determination. This process is successively executed by the ECU 100 a predetermined multiple number of times in one trip at a predetermined calculation timing, for example, each travel of 1000 km. The process is executed multiple times in the same trip to thereby make it possible to improve accuracy because there is a small difference in detection condition among the multiple processes.

First, the ECU 100 sets the injection rates $\alpha$ and $\beta$ at a first predetermined ratio A:B (for example, 70:30), and causes the PFIs 2 and the DIs 3 to inject fuel (S110). Then, an air-fuel ratio fluctuation parameter XA is calculated on the basis of an output from the pre-catalyst sensor 20 that serves as the air-fuel ratio sensor (S120).

Subsequently, the ECU 100 sets the injection rates $\alpha$ and $\beta$ at a second predetermined ratio C:D (for example, 30:70) to cause the PFIs 2 and the DIs 3 to inject fuel (S130). Then, an air-fuel ratio fluctuation parameter XB is calculated on the basis of an output from the pre-catalyst sensor 20 that serves as the air-fuel ratio sensor (S140).

When the air-fuel ratio fluctuation parameters XA and XB are calculated in this way, the ECU 100 subsequently determines whether a determination condition is satisfied (S150). When the determination condition is not satisfied, the processes of steps S110 to S140 are repeatedly executed. The determination condition here is satisfied when the vehicle is in a steady running state after completion of warm-up of the engine, and the above determination is affirmative when, for example, all the following conditions are satisfied.

A variation in throttle opening degree is smaller than or equal to a predetermined value.
An engine rotational speed falls within a predetermined range,
A vehicle speed falls within a predetermined range.
A period of time elapsed after the start of fuel cut is longer than or equal to a predetermined value.
A period of time elapsed after the start of the engine is longer than or equal to a predetermined value.
A period of time elapsed after a shift change is longer than or equal to a predetermined value.
A period of time elapsed after A/F active control is longer than or equal to a predetermined value. Note that A/F active control here is an alternately changing operation of air-fuel ratio for carrying out a response diagnosis of the air-fuel ratio sensor.

Figure 10:
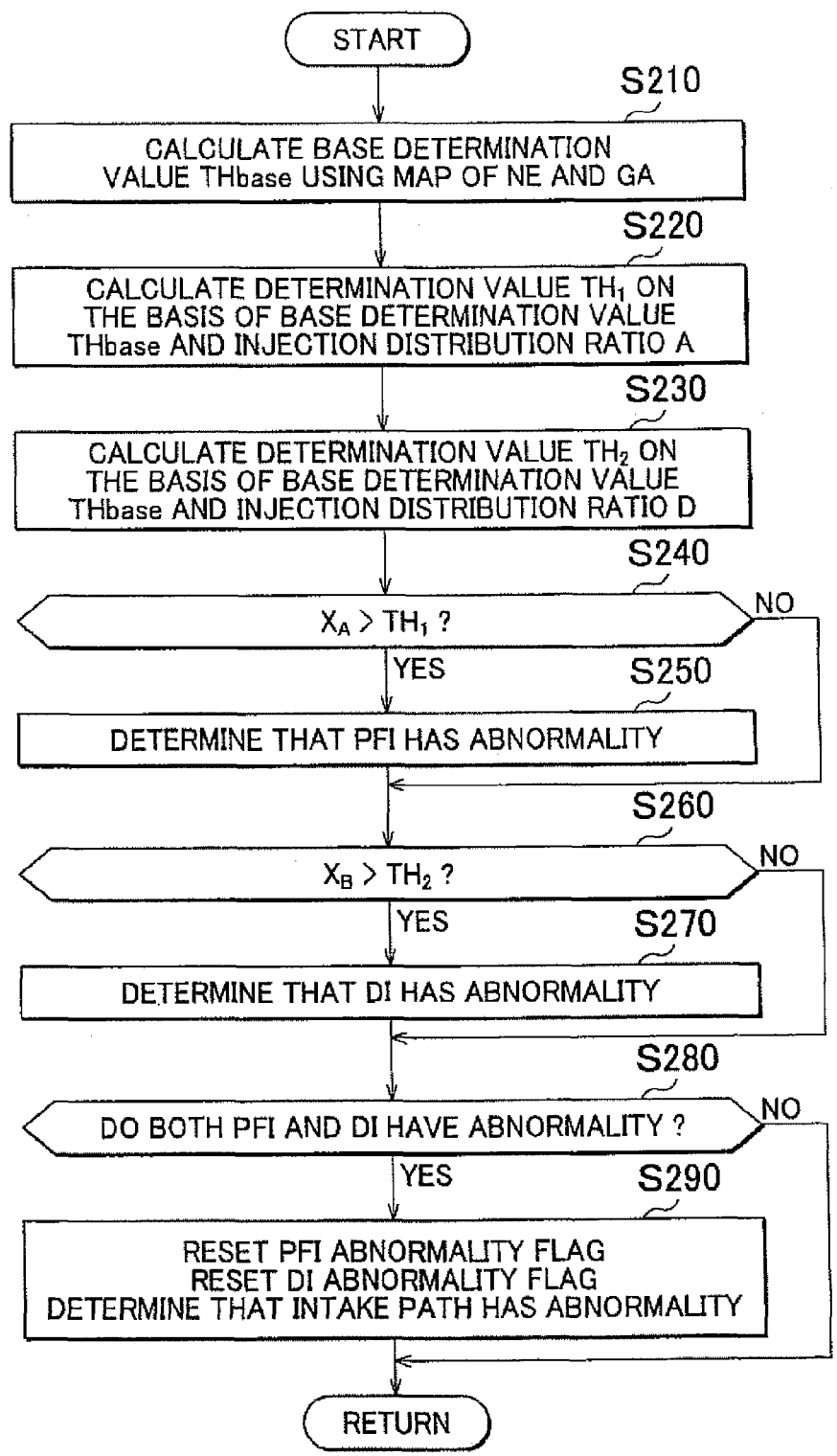
FIG. 10 is a flow chart that shows an abnormality determination process and a normalizing process.

When the determination condition is satisfied, the ECU 100 calculates a determination value and carries out abnormality determination using the processing routine shown in FIG. 10 (S160).

Figure 8:
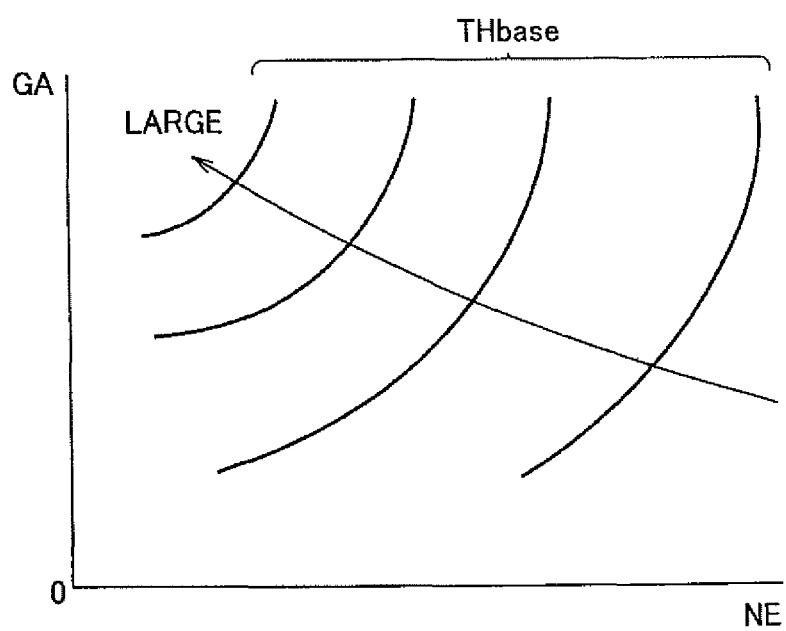
FIG. 8 is a graph that shows an example of a base determination value map set in order to obtain a base determination value from an engine rotational speed and an intake air flow rate.

In FIG. 10, the ECU 100 calculates a base determination value THbase (S210). This calculation is carried out using a base determination value map (see FIG. 8) based on an engine rotational speed NE and an intake air flow rate GA. Generally, as the engine rotational speed decreases and the intake air flow rate increases, the air-fuel ratio fluctuation parameters XA and XB increase. Thus, the base determination value THbase is set so as to increase as the engine rotational speed decreases and the intake air flow rate increases in the map as shown in FIG. 8 in order to cancel the influence of these NE and GA. By so doing, the influence of the engine rotational speed NE and intake air flow rate GA is eliminated.

Subsequently, the ECU 100 calculates a determination value TH1 on the basis of the base determination value THbase and an injection distribution ratio A (S220). This calculation is carried out using the following mathematical expression (2).

$$TH1 = THbase * A/100 \qquad (2)$$

Subsequently, the ECU 100 calculates a determination value TH2 on the basis of the base determination value THbase and an injection distribution ratio D (S230). This calculation is carried out using the following mathematical expression (3).

$$TH2 = THbase * D/100 \qquad (3)$$

Subsequently, the ECU 100 determines whether the air-fuel ratio fluctuation parameter XA is larger than the determination value TH1 calculated using the mathematical expression (1) (S240), and, when affirmative determination is made, the ECU 100 determines that the PFIs 2 have an abnormality (S250) and sets a predetermined PFI abnormality flag. When negative determination is made, step S250 is skipped.

Subsequently, the ECU 100 determines whether the air-fuel ratio fluctuation parameter XB is larger than the determination value TH2 calculated using the mathematical expression (2) (S260), and, when affirmative determination is made, the ECU 100 determines that the DIs 3 have an abnormality (S270) and sets a predetermined DI abnormality flag. When negative determination is made, step S270 is skipped.

Subsequently, it is determined whether both the PFIs 2 and the DIs 3 have an abnormality on the basis of the status of the PFI abnormality flag and the status of the DI abnormality flag (S280), and, when affirmative determination is made, that is, when both have an abnormality, both flags are reset, and a predetermined intake path abnormality flag is set (S290), after which the routine is exited. When negative determination is made, step S290 is skipped.

Note that it is applicable that usage of the fuel injection valve determined to have an abnormality is prohibited and only the other fuel injection valve (when three or more fuel injection valves are provided for each cylinder, the remaining fuel injection valves) is used to continue operation. When the degree of abnormality (that is, the air-fuel ratio fluctuation parameter XA or XB) is low and does not require immediate repair or replacement, the timing of repair or replacement of that member may be predicted and stored in a predetermined diagnosis memory or an output, such as lighting an alarm indicator in a vehicle cabin, may be performed.

In addition, the detected air-fuel ratio fluctuation parameter XA or XB may be used to determine variable control amounts in various controls for cancelling an imbalance. Such controls include changing the fuel injection timing (for example, the fuel injection timing of each cylinder having a rich air-fuel ratio is set in the exhaust stroke and the fuel injection timing of each cylinder having a lean air-fuel ratio is set in the intake stroke) and changing the ignition timing (for example, the ignition timing of each cylinder having a rich air-fuel ratio is retarded and the ignition timing of each cylinder having a lean air-fuel ratio is advanced).

In addition, in order to cancel an imbalance, it is conceivable to execute control so as to correct the operation of the fuel injection valves PFIs 2, DIs 3 or intake valves in a direction to cancel the cause of each abnormality, for example, by increasing (reducing) the fuel injection duration, increasing (reducing) the effective opening area in the case of a variable injection hole injection valve, or increasing (reducing) the opening degree of each intake valve or increasing (reducing) the valve open duration in the case of a lean deviation due to an intake system abnormality, and the air-fuel ratio fluctuation parameter XA or XB may be reflected in correction amounts of such controls. For example, as the degree of abnormality increases, the control amount may be increased.

As described above, in the present embodiment, in the configuration for detecting an abnormal variation for each of the plurality of fuel injection valves (the set of PFIs 2 and the set of DIs 3) on the basis of the injection rates α and β between the plurality of fuel injection valves (PFI 2 and DI 3), the air-fuel ratio fluctuation parameter XA before the injection rates are changed and the air-fuel ratio fluctuation parameter XB after the injection rates are changed, the abnormality determination threshold THbase is corrected on the basis of the injection rates α and β to calculate the determination values TH1 and TH2. Thus, it is possible to reduce a possibility of erroneous detection due to a change in the injection rates α and β.

In addition, in the present embodiment, when an abnormal variation has been detected from all the plurality of fuel injection valves (PFI 2 and DI 3), it is determined that the intake path has an abnormality. Thus, air-fuel ratio information may be utilized to detect an abnormality of the intake path.

The embodiment of the invention is described above in detail; however, various alternative embodiments of the invention are conceivable. For example, in the above described embodiment, injection having the injection distribution ratio A:B at which the PFIs 2 are mainly used (S10) and injection having the injection distribution ratio C:D at which the DIs 3 are mainly used are continuously carried out and abnormality detection for the PFIs 2 and the DIs 3 is carried out at the same time; instead, injection having the injection distribution ratio A:B and abnormality determination for the PFIs 2 may be carried out at a different timing from injection having the injection distribution ratio C:D and abnormality determination for the DIs 3.

In addition, in the above described embodiment, an abnormal air-fuel ratio variation among the cylinders is detected on the basis of a fluctuation in air-fuel ratio; instead, it may be detected on the basis of a fluctuation in rotation of the internal combustion engine. In this case, for example, the ratio of a period of time required for a crankshaft to rotate 30° C. A near the TDC for a cylinder with respect to a value in another cylinder may be used as the air-fuel ratio fluctuation parameter. Any value that correlates with the degree of fluctuation in pre-catalyst sensor output may be used as the air-fuel ratio fluctuation parameter. For example, the air-fuel ratio fluctuation parameter may be calculated on the basis of a difference between the maximum and minimum (so-called peak to peak) of the pre-catalyst sensor output in one engine cycle. This is because, as the degree of fluctuation in pre-catalyst sensor output increases, the difference increases. An abnormal air-fuel ratio variation may be detected on the basis of an air-fuel ratio feedback correction amount.

In addition, the number of cylinders, type, application, and the like, of the engine are not specifically limited. The number of fuel injection valves for each cylinder may be any multiple number larger than or equal to 3. In addition, the plurality of fuel injection valves may be provided in any of the intake port and the cylinder. All the fuel injection valves may be provided in the intake port or all the fuel injection valves may be provided in the cylinder. In the case of a spark ignition internal combustion engine, such as a gasoline engine, alternative fuel (for example, gaseous fuel, such as alcohol and CNG) may be used.

The aspect of the invention is not limited to the above described embodiments; the aspect of the invention encompasses all alternative embodiments and application examples within the idea of the invention defined by the appended claims and equivalents thereof. Thus, the aspect of the invention should not be interpreted restrictively. The aspect of the invention may also be applied to any other techniques that belong to the scope of the idea of the invention.

What is claimed is:

1. An apparatus for detecting an abnormal air-fuel ratio variation, comprising:
an abnormality detecting unit that detects an abnormal variation in air-fuel ratio among a plurality of cylinders of an internal combustion engine on the basis of a fluctuation in a predetermined output of the internal combustion engine, the internal combustion engine having a plurality of fuel injection valves for each of the plurality of cylinders; and
a setting unit that sets an abnormality determination threshold that determines whether the predetermined output has an abnormality on the basis of a rotational speed of the internal combustion engine and a load of the internal combustion engine,
wherein the abnormality detecting unit detects an abnormal variation in each of the plurality of fuel injection valves on the basis of an injection ratio between the plurality of fuel injection valves, and the predetermined output before the injection ratio is changed and the predetermined output after the injection ratio is changed, and
wherein the setting unit corrects the abnormality determination threshold on the basis of the injection ratio.

2. The apparatus according to claim 1, wherein:
the plurality of fuel injection valves include an intake passage injector and a direct injector; and
the injection ratio is a ratio of a port injection amount from the intake passage injector and a direct injection amount from the direct injector.

3. The apparatus according to claim 1, wherein:
the abnormality detecting unit detects an abnormal variation in one of the set of intake passage injectors and the set of direct injectors on the basis of a degree of variation in air-fuel ratio among the cylinders at the time when fuel is injected on the basis of the injection ratio before the injection ratio is changed; and
the abnormality detecting unit detects an abnormal variation in the other one of the set of intake passage injectors and the set of direct injectors on the basis of a degree of variation in air-fuel ratio among the cylinders at the time when fuel is injected on the basis of the injection ratio after the injection ratio is changed.

4. The apparatus according to claim 1, wherein the abnormality detecting unit determines that an intake path has an abnormality when an abnormal variation has been detected in all the plurality of fuel injection valves.

5. The apparatus according to claim 1, wherein the abnormality detecting unit detects an abnormal variation in each of the plurality of fuel injection valves on the basis of an injection ratio between the plurality of fuel injection valves, and the fluctuation in the predetermined output before the injection ratio is changed and the fluctuation in the predetermined output after the injection ratio is changed.

6. The apparatus according to claim 1, wherein the setting unit corrects the abnormality determination threshold for each of the plurality of fuel injection valves on the basis of the injection ratio.

* * * * *